United States Patent
Moss

(10) Patent No.: US 7,125,825 B2
(45) Date of Patent: Oct. 24, 2006

(54) AMIDOAMINE SALT-BASED VISCOSIFYING AGENTS AND METHODS OF USE

(75) Inventor: David Kelly Moss, Whitewater, WI (US)

(73) Assignee: Tomah Products, Inc., Milton, WI (US)

( * ) Notice: Subject to any disclaimer, the term of this patent is extended or adjusted under 35 U.S.C. 154(b) by 0 days.

(21) Appl. No.: 10/424,119

(22) Filed: Apr. 25, 2003

(65) Prior Publication Data

US 2004/0214725 A1 Oct. 28, 2004

(51) Int. Cl.
  *C09K 8/62* (2006.01)
(52) U.S. Cl. .................. 507/240; 507/244; 507/922; 166/308.2; 166/308.3; 546/247; 546/244; 548/558; 548/568; 564/197
(58) Field of Classification Search .......... 507/240, 507/244, 922; 166/308.2, 308.3; 546/247, 546/244; 548/558, 568; 564/197
See application file for complete search history.

(56) References Cited

U.S. PATENT DOCUMENTS

| | | | |
|---|---|---|---|
| 4,735,731 A | 4/1988 | Rose et al. | |
| 5,258,137 A * | 11/1993 | Bonekamp et al. | 516/11 |
| 5,270,310 A * | 12/1993 | Bell et al. | 514/238.2 |
| 5,462,689 A | 10/1995 | Choy et al. | |
| 5,551,516 A | 9/1996 | Norman et al. | |
| 5,556,615 A | 9/1996 | Janchitraponvej et al. | |
| 5,639,722 A | 6/1997 | Kong et al. | |
| 5,833,764 A | 11/1998 | Rader et al. | |
| 5,979,555 A | 11/1999 | Gadberry et al. | |
| 5,979,557 A | 11/1999 | Card et al. | |
| 6,239,183 B1 | 5/2001 | Farmer et al. | |
| 6,306,800 B1 * | 10/2001 | Samuel et al. | 507/129 |
| 6,410,489 B1 * | 6/2002 | Zhang et al. | 507/202 |
| 6,412,561 B1 * | 7/2002 | Brown et al. | 166/308.2 |
| 6,426,321 B1 | 7/2002 | Durrieu et al. | |
| 6,435,277 B1 * | 8/2002 | Qu et al. | 166/281 |
| 6,506,710 B1 | 1/2003 | Hoey et al. | |
| 6,605,570 B1 * | 8/2003 | Miller et al. | 507/211 |
| 6,964,940 B1 * | 11/2005 | Treybig et al. | 507/129 |
| 2002/0002205 A1 | 1/2002 | Dahayanake et al. | |
| 2002/0147114 A1 | 10/2002 | Dobson, Sr. et al. | |

FOREIGN PATENT DOCUMENTS

WO WO 01/18147 3/2001

OTHER PUBLICATIONS

Kaler, Eric W., Raghavan, Srinivasa R.: Highly Viscoelastic Wormlike Micellar Solutions Formed by Cationic Surfactants with Long Unsaturated Tails, Langmuir, 2001, 17, 300-306.

* cited by examiner

*Primary Examiner*—Philip C. Tucker
(74) *Attorney, Agent, or Firm*—Jansson, Shupe, Munger & Antaramian, Ltd.

(57) ABSTRACT

Viscoelastic surfactants are described for use in aqueous systems to generate thickened fluids. The surfactants are alkyl amidoamine salts of inorganic acids and/or organic acids. The fluids may also contain inorganic salts, organic salts or mixtures thereof. Additionally, the fluids may contain a co-surfactant. These fluids are particularly useful in oilfield applications such as hydraulic fracturing, gravel packing, drilling, completion, etc. Viscoelastic fluids of the invention are also useful in industrial and consumer product fluid applications as rheology control agents.

61 Claims, 3 Drawing Sheets

AMIDOAMINE SALT-BASED VISCOSIFYING AGENTS AND METHODS OF USE

BACKGROUND OF THE INVENTION

1. Field of the Invention

The present invention relates to viscosifying agents and, more specifically, to viscosifying agents useful in forming aqueous-based viscoelastic fluids and methods of using such agents.

2. Description of the Related Art

The rheological properties of fluids used in a broad range of industrial and consumer-oriented applications are routinely modified in order to improve the performance of such fluids. For example, many types of fluids must be thickened such that the fluids have a viscosity sufficient for the particular application for which the fluid is intended for use. Viscosifying agents are typically used to impart the required viscosity to such fluids.

Oilfield, industrial and consumer product fluids are representative of the types of fluids to which viscosifying agents are added to enhance the viscosity and performance of such fluids. Oilfield fluids which require enhanced viscosities may include fluids for use in hydraulic fracturing, drilling, well completion and gravel packing operations. Thickened fluids may also be used in industrial applications such as for use as drag reducing agents for pipeline transport of fluids. Consumer product fluids which commonly incorporate viscosifying agents may include shampoos, hard surface cleaners, detergents and the like.

For oilfield fluids, highly viscous fluids facilitate many different aspects of the drilling process. For example, hydraulic fracturing operations utilize viscous fluids to stimulate the recovery of fluids, such as oil, natural gas or brine, from a reservoir located in a subterranean formation. In the process, a fracturing fluid is pumped downhole into a wellbore at pressures sufficient to fracture the subterranean formation. Proppant material (e.g., sand, glass beads, polystyrene beads, etc.) is suspended in the fracturing fluid and is thereby carried into the newly developed fractures and fissures in the subterranean formation. When the pressure is released from the fracturing fluid, the proppant serves to keep the subterranean formation from closing back on itself. Beneficially, the formation fractures stabilized by the deposited proppant are permeable to liquid and gas flow from the reservoir. Because of this formation permeability, oil, natural gas, brine or other subterranean fluids are able to flow into the wellbore for recovery. The fracturing operation is considered an enhanced oil recovery (EOR) technique designed to increase fluid recovery.

Hydraulic fracturing fluids are thickened or viscosified mainly to initiate and propagate fractures of the subterranean formation and to suspend the proppant. The fracturing fluids are typically aqueous-based and may be composed of fresh water or brine. Historically, polymers such as naturally occurring polysaccharides and modified cellulosic derivatives have been used to viscosify fracturing fluids. The polymers are frequently cross-linked with organometallic compounds (borates, zirconates, titanates, etc.) to achieve highly viscous fluids.

There are a number of disadvantages associated with fracturing fluids thickened with polymer-based materials. One disadvantage of polymer-based fluids is that fluid viscosity is sensitive to shear. A further disadvantage of polymer-based fluids is that a chemical breaker, such as a peroxide, must be utilized if the user wishes to decrease the viscosity of the fluid. Preparation of the polymer-based fluids is time consuming and generally requires expensive equipment at the wellsite.

Furthermore, polymer-based fracturing fluids are known to cause wellbore damage through precipitation of residual chemical fragments or undisolved material. The polysaccharide-based systems usually contain insoluble materials that can be difficult to remove from the formation resulting in residues that seal or plug the created fractures and fissures. Similarly, the modified cellulose derivatives can form inconsistent fluids due to incomplete hydration. The insoluble cellulosic materials can cause wellbore damage by precipitating out of solution onto the formation face. For maximum reservoir fluid recovery, it is essential that all chemical residues are removed from the wellbore following a hydraulic fracturing operation.

Viscoelastic surfactant-based fluids represent a group of fluids which may have utility in oilfield applications, such as fracturing operations. And, viscoelastic fluids offer benefits not found in polymer-based fluids. Viscoelastic fluids are fluids which exhibit both solid-like (elastic) and liquid-like (viscous) character. Surfactant-based aqueous systems are referred to as viscoelastic if they at least partially recover to their initial state after abatement of an applied stress. For such viscoelastic surfactant-based systems, it is thought that under certain conditions (usually in the presence of brine) cationic, amphoteric and zwitterionic surfactants associate into worm-like, rod-like or cylindrical micelles which entangle much like polymers to produce viscosity. It is thought that electrostatic intermolecular interactions between the surfactant molecules are responsible for the micelle formation. Thus, the micelles are disrupted by application of shear forces and reform once the shear forces are abated. This differs from polymer-based systems which involve covalent bonds that may be permanently broken under shear resulting in loss of fluid viscosity.

One qualitative test useful for determining the characteristic of viscoelasticity is to determine whether the formulation exhibits properties referred to as "recoil" or "rebound." To determine viscoelasticity based on recoil, a formulation is simply swirled in a manner that creates suspended bubbles. If recoil is observed when the swirling motion is stopped, the solution is considered to be viscoelastic. This characteristic is a function of spatial memory associated with the elastic or solid-like nature of a viscoelastic fluid.

Viscoelastic surfactants may also be characterized by reversible shear thinning. When such a fluid is passed through a high shear environment, such as a pump, low viscosity is observed. When the shear is removed, the rod-like micelles are reformed and higher viscosity is restored.

Therefore, viscoelastic fluids would appear to be potentially quite advantageous in outfield applications and other applications because they can be pumped easily at low viscosity yet reform as a high viscosity fluid following pumping. Such viscoelastic fluids may be further advantageous for oilfield applications because they generally lose viscosity on dilution in water-miscible hydrocarbons, such as lower molecular weight components of reservoir fluid. This characteristic would greatly reduce wellbore damage from chemical precipitation.

Viscoelastic fluids, however, are potentially temperature sensitive. Kaler in *Highly Viscoelastic Wormlike Micellar Solutions Formed by Cationic Surfactants with Long Unsaturated Tails*, Langmuir, 2001, 17, 300–306 indicates that it is commonly theorized that as temperature increases, the length of the rod-like micelles decreases. As such, the viscosity due to micelle entanglement is decreased with increased temperature. This is potentially disadvantageous in outfield applications where elevated temperatures are encountered.

A number of viscoelastic fluids are identified in the literature. However, such fluids are not entirely satisfactory, for example, because they may be unstable under conditions typically encountered in oilfield applications. For example, U.S. Pat. No. 5,551,516 (Norman et al.) discloses the use of quaternary ammonium salts in conjunction with an inorganic salt and a stabilizing organic salt to generate aqueous-based viscoelastic fluids. These compounds are described to be useful as fracturing fluids, but are limited by high temperature instability. Similarly, U.S. Pat. No. 6,239,183 (Farmer et al.) discloses the use of amidoamine oxides, alkoxylated monoamine salts of aromatic dicarboxylic acids and alkyldiamine salts of aromatic dicarboxylic acids as viscoelastic surfactants. These compounds are also claimed to be effective as fracturing fluids but are limited by high temperature instability. When the aforementioned fluids encounter high temperatures, viscosity is lost which causes the proppant to prematurely settle into the formation and additionally causes the fracturing fluid to leak off into the formation.

Oilfield applications, other than fracturing operations, also require the use of thickened fluids. For example, drilling fluids or muds are circulated through the drill bit and up the wellbore annulus during drilling operations. It is necessary for these fluids to maintain high viscosity and density. High viscosity is necessary to transfer drill cuttings up the annulus for separation at the surface and to transfer energy to the drill bit. The fluids must have high density to control pressure on the formation and to support the weight of the drill string. Although drilling muds have traditionally been thickened with clays (bentonite, attapulgite, etc.), U.S. Pat. No. 6,426,321 (Durrieu, et al.) discloses the use of surfactant mixtures to produce biodegradable drilling muds.

Thickened fluids are also required as so-called "completion fluids." After a well has been drilled, it is necessary to flush out the wellbore prior to casing. This is accomplished with a completion fluid. These fluids are typically high brine solutions that are viscosified to avoid fluid leak-off into the formation. The completion fluid further serves to avoid premature reservoir fluid entry into the wellbore during perforation. The thickening agent must be capable of thickening the completion fluid under the high-brine conditions typically encountered immediately following the drilling operation.

Yet another oilfield application requiring thickened fluids involves "gravel packing" operations. Gravel packing operations are used to avoid excess sand production during reservoir fluid recovery. In this operation, after sand cleanout, gravel suspended in a thickened fluid is pumped into the sand producing zone. Once the gravel is in place, a wire-wrapped screen, or screen liner, is positioned between the production tubing and the gravel. The sand is then prevented from entering the production tubing by gravel filtration. As discussed by Nehmer in "Viscoelastic Gravel-Pack Carrier Fluid" Society of Petroleum Engineers (SPE) Paper 17168, surfactants find utility as viscosifying agents in gravel packing operations.

Thickening agents are also used in industrial applications as "drag reducing" agents. Thickening agents in the form of surfactants may be added to an aqueous solution that is stirring at a high rate. The vortex is quickly eliminated during dissolution of the surfactant. Drag reducing agents find use in pipeline transport of fluids to reduce turbulent flow. The utility of cationic surfactants as drag reducing agents is discussed by Campbell and Jovancicevic in "Performance Improvements from Chemical Drag Reducers" Society of Petroleum Engineers (SPE) Paper 65021.

The use of viscoelastic surfactants in consumer product fluids is exemplified by U.S. Pat. No. 5,639,722 (Kong et al.), wherein acidic cleaning compositions are thickened with cetyl trimethylammonium chloride and sodium xylene sulfonate. In U.S. Pat. No. 5,833,764 (Rader et al.) the use of cetyl trimethylammonium chloride as a viscosifier for an aqueous-based drain opener is disclosed.

It would be an improvement in the art to provide a viscoelastic thickening fluid and method of use of such fluid which would be capable of thickening fluids used in many different applications, which would thicken fluids under temperature and environmental conditions typically encountered in the particular application and which would provide an alternative to existing thickening agents.

SUMMARY OF THE INVENTION

The present invention relates to novel surfactant compositions which create viscoelastic fluids under appropriate conditions. These fluids are useful for thickening aqueous fluids and for suspending proppants, particles and components therein. The fluids advantageously may be formulated to impart a viscosity such that the fluids are suitable for use in many applications including for use in oilfield fracturing, drilling, completion, gravel packing and drag reducing applications. And, fluids including surfactant compositions according to the invention enjoy these viscosity benefits under conditions of elevated temperature and brine content typical of those found in the oilfield. Fluids including surfactants of the invention are also suitable for use in consumer product applications such as shampoos and cleaning compositions. Such fluids are compatible for use with strong acids and other agents typically found in hard surface cleaners and cleansers. It is anticipated that fluids including surfactant compositions of the invention will have many other applications where modification of fluid rheology is desired.

In general, viscoelastic fluids of the invention comprise an amidoamine salt surfactant component and an aqueous medium including the amidoamine salt surfactant component. The most highly preferred forms of the amidoamine salt surfactant have the general structure:

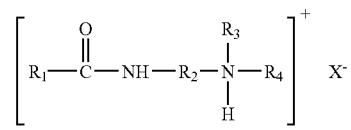

wherein $R_1$ is a branched or straight chained, saturated or unsaturated aliphatic group of from about 10 to about 30 carbon atoms; $R_2$ is (a) a divalent alkylene group consisting of from about 2 to about 6 carbon atoms, or (b) $R_2$ together with $R_3$ form a heterocyclic 5- or 6-membered ring structure which includes the nitrogen of the amine and the nitrogen of the amide; $R_3$ is (a) a branched or straight chained alkyl group of from about 1 to about 6 carbon atoms or a branched or straight chained hydroxyalkyl group, or (b) $R_3$ together with $R_2$ form a heterocyclic 5- or 6-membered ring structure which includes the nitrogen of the amine and the nitrogen of the amide, or (c) $R_3$ together with $R_4$ form a heterocyclic 5- or 6-membered ring structure which includes the nitrogen of the amine; $R_4$ is (a) a branched or straight chained alkyl group or hydroxyalkyl group of from about 1 to about 6 carbon atoms, or (b) $R_4$ together with $R_3$ form a heterocyclic 5- or 6-membered ring structure which includes the nitrogen of the amine; and X– comprises an anion.

Most preferably, the amidoamine salt surfactant comprises about 0.10 to about 10% by weight of the total viscoelastic fluid composition with the balance of the viscoelastic fluid comprising the aqueous medium and, optionally, additional components. The amidoamine salt surfactant may comprise an amount greater than about 10% by weight of the total viscoelastic fluid but this would result in a highly elevated fluid viscosity. The aqueous medium of the invention represents any water-containing system.

Viscoelastic fluids of the invention preferably include optional components. For example, such fluids may include an organic and/or inorganic salt component provided to facilitate formation of the viscous fluid. The viscoelastic fluid of the invention may optionally include a co-surfactant selected from the group consisting of cationic, anionic, zwitterionic and amphoteric surfactants and mixtures thereof. The anion X– is preferably an anion dissociated from an inorganic or organic acid present in the fluid.

The invention includes a method of fracturing a subterranean formation. The method preferably comprises the steps of providing a surfactant-based aqueous viscoelastic hydraulic fracturing fluid and pumping the surfactant-based aqueous viscoelastic fluid through a wellbore and into a subterranean formation at sufficient pressures to fracture the formation. The surfactant-based aqueous viscoelastic fluid preferably comprises the aqueous medium and amidoamine salt surfactant as described above in connection with the composition of matter.

The amidoamine salt surfactant of the invention may be used in further methods including a method for modifying fluid rheology. The method preferably comprises the steps of providing an aqueous medium and providing an amidoamine salt surfactant in the aqueous medium to control rheology of the aqueous medium. In this method, the amidoamine salt surfactant is provided in an amount of about 0.1% to about 10% of the weight of the total viscoelastic fluid. The aqueous medium and amidoamine salt surfactant for use in the method are described herein in connection with the composition of matter.

Throughout this application, reference to moieties having a range of carbon atoms is intended to indicate that the carbon atoms may be in any suitable conformation including branched, straight chained and cyclic, saturated or unsaturated. It is also to be understood that reference to any particular number of carbon atoms or other moieties is intended to include products in which one component predominates but in which distributions of other components may be present. Unless otherwise indicated, all weight percentages refer to the percentage of the component to the total viscoelastic fluid.

Further details regarding the invention are set forth in the drawings and detailed descriptions which follow.

DESCRIPTION OF THE PREFERRED EMBODIMENTS

Figure 1:
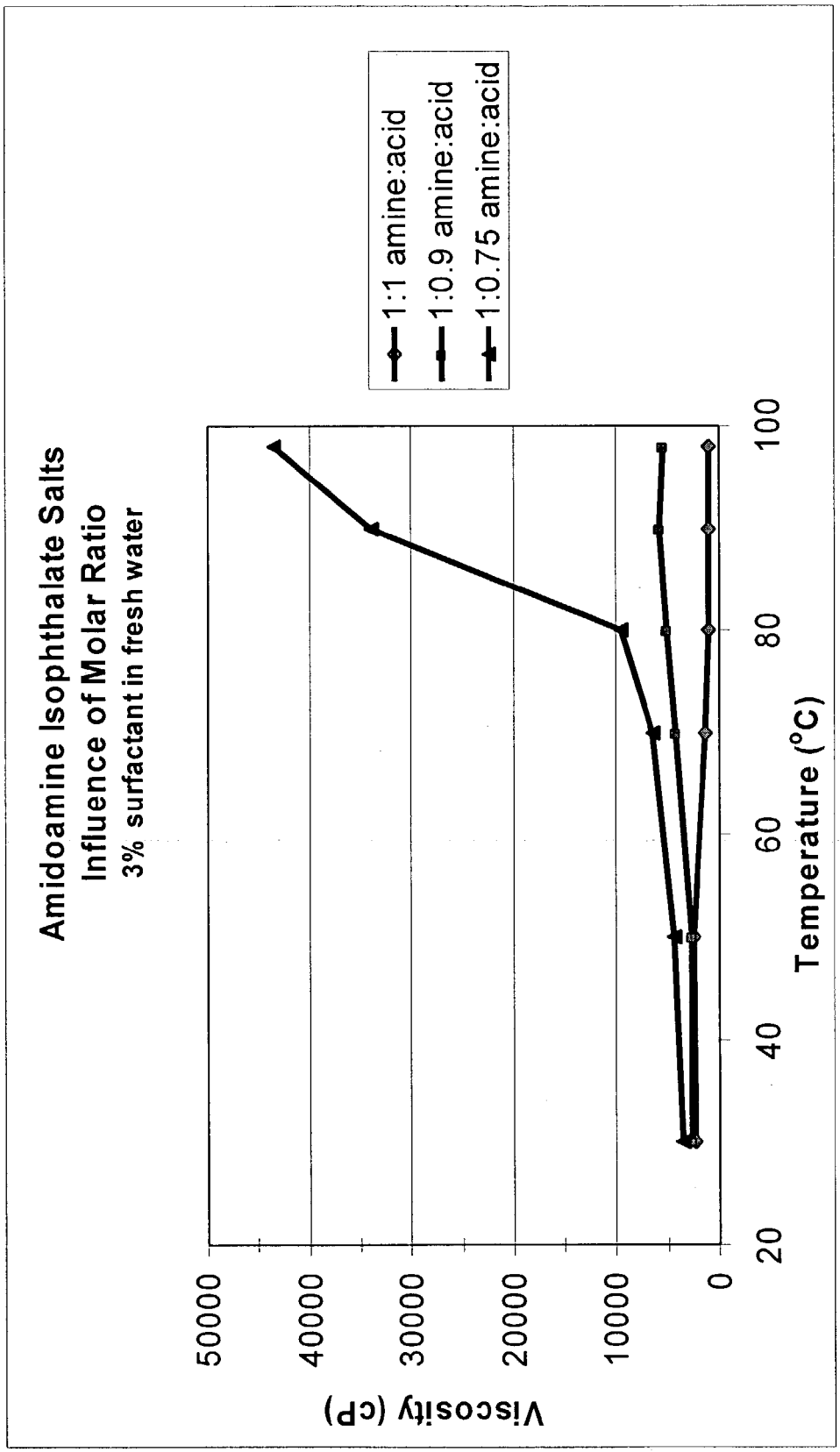
FIG. 1 is a graph which demonstrates the efficacy of certain invention embodiments including a fresh water aqueous medium and further demonstrates that acid concentration may be adjusted to modify the fluid viscosity.

Viscoelastic fluids can be obtained as described below by providing an amidoamine salt surfactant suitable for use in an aqueous medium. The amidoamine salt surfactant serves as a thickening, or viscosifying, agent which advantageously serves to control fluid rheology and viscosity. Surfactants and fluids according to the invention may be characterized as viscoelastic in that they exhibit recoil and the physical property of reversible shear thinning. Viscoelastic fluids of the invention have a reduced fluid viscosity when shear is applied and that viscosity is at least partially recovered after the applied stress is removed. Advantageously, these properties of the invention contribute to ease of viscoelastic fluid handling because the fluids may be readily pumped without loss of viscosity ultimately required for the particular application.

The amidoamine salt surfactant may be preformed or formed in situ thereby offering the user considerable flexibility with respect to formulation of the viscoelastic fluids. For example, the amidoamine salt surfactant may be formulated separately and then subsequently be admixed with the aqueous medium to form the viscoelastic fluid. Alternatively, the amidoamine salt surfactant may be formed in situ by admixing an amidoamine surfactant component with an acid component in the aqueous medium. Component ratios may be adjusted and optional components added to enhance the performance characteristics of the viscoelastic fluids. The viscoelastic fluids have utility in a broad range of applications including, for example, as oilfield fluids (e.g., hydraulic fracturing, gravel packing, drilling and completion fluids), as industrial drag-reducing agents and as rheology modifiers useful in consumer product fluids such as shampoos, hard surface cleaners, cleansers and the like.

The amidoamine salt surfactant serving as the thickening agent has the general structure of the formula I:

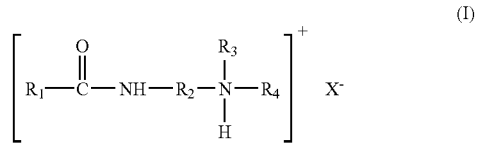

(I)

In the embodiment of formula I, $R_1$ is a branched or straight chained, saturated or unsaturated aliphatic group of from about 10 to about 30 carbon atoms. Preferably the aliphatic group has from about 16 to about 22 carbon atoms. Most preferably, $R_1$ is a fatty aliphatic moiety derived from rapeseed oil. $R_1$ may be restricted to a single chain length or may be of mixed chain length such as those derived from natural fats and oils or petroleum sources. Preferred are coco alkyl, tallow alkyl, rapeseed alkyl, hardened rapeseed alkyl, oleyl or soya alkyl, most preferred is erucyl alkyl.

$R_2$ is a divalent alkylene group consisting of about 2 to about 6 carbon atoms, preferably from about 2 to about 4 carbon atoms and most preferably about 3 carbon atoms. In a further embodiment, $R_2$ together with $R_3$ may form a heterocyclic 5- or 6-membered ring structure which includes the nitrogen of the amine and the nitrogen of the amide. Preferably, the heterocyclic 5-membered ring structure may be derived from pyrroloidine as in formula III below, while it is preferred that the 6-membered ring structure is derived from piperidine or morpholine as represented in formulae IV and V respectively.

$R_3$ is a branched or straight chained alkyl group of from about 1 to about 6 carbon atoms or a branched or straight chained hydroxyalkyl group. Preferably, $R_3$ is hydroxyethyl or methyl. $R_3$ together with $R_2$ may form the heterocyclic 5- or 6-membered ring structure described above which includes the nitrogen of the amine and the nitrogen of the amide. $R_3$ together with $R_4$ may also form a heterocyclic 5- or 6-membered ring structure which includes the nitrogen of the amine. Preferably, the heterocyclic 5-membered ring structure may be derived from 1-methylpiperazine as illustrated in formula VI below, while the preferred 6-membered ring structure is derived from 1-methylimidazolidine as represented by formula VII.

$R_4$ is a branched or straight chained alkyl group or hydroxyalkyl group of from about 1 to about 6 carbon atoms. In this embodiment, $R_4$ is preferably hydroxyethyl or methyl. In a further embodiment, $R_4$ together with $R_3$ may form the heterocyclic 5- or 6-membered ring structure which includes the nitrogen of the amine as previously described.

X– is an anion. Preferably the anion X– is dissociated from an acid component provided to form the salt. The acid component is preferably selected from the group consisting of phosphoric acid, sulfuric acid, hydrochloric acid, hydrobromic acid, hydroiodic acid, hypochloric acid, acetic acid, other aliphatic carboxylic acids, perchloric acid, formic acid, salicylic acid, phthalic acid, isophthalic acid, terphthalic acid, lactic acid, malic acid, citric acid, benzoic acid, napthoic acid and mixtures thereof. Accordingly, X– may comprise halides, oxo ions of phosphorus, sulfur or chloride and may further comprise chlorides, bromides, iodides, oxides of phosphorus, hypochlorides, phosphates, oxides of sulfur, sulfates, sulfites, sulfonates, phosphates, acetates, other aliphatic carboxylates, chlorates, perchlorates. X– may also comprise anions derived from organic acid salts such as salicylates, phthalates, isophthalates, terphthalates, lactates, maleates, glycinates, citrates, benzoates, napthoates, and the like.

The acid component is present in an amount sufficient to neutralize the amidoaminte surfactant and comprises about 0.01% to about 50% by weight of the total viscoelastic fluid with a more highly prefer red range being about 0.01% to about 20% by weight of the total viscoelastic fluid. Viscoelastic fluids having a greater acid concentration would be appropriate for use as a drain opener composition or as a hard surface cleaner, such as a toilet bowl cleaner.

The aqueous medium of the invention represents any water-based system. The aqueous medium may comprise fresh water or brine. While the aqueous medium may comprise deinoized water, it is anticipated that the water may include components typical of those found in the environment such as salts, muds, sands and organic and inorganic compounds.

The amidoamine salt surfactant comprises about 0.1% to about 10% by weight of the total viscoelastic fluid, preferably about 1% to about 8% by weight of the viscoelastic fluid, and most preferably about 2% to about 4% by weight of the viscoelastic fluid. The balance of the viscoelastic fluid comprises the aqueous medium and, optionally, additive components such as those described herein.

In a specific preferred embodiment, $R_2$ is propyl and the surfactant is an alkylamidopropyldialkylammonium salt having the structure represented by the formula II:

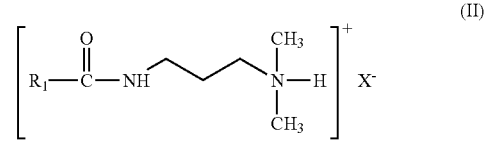

According to this preferred embodiment, $R_1$ is erucylalkyl, $R_3$ and $R_4$ are methyl and X– is as an anion as previously defined. As the alkyl chain length of $R_1$ is decreased, the viscosity of the corresponding viscoelastic fluid is decreased. When $R_1$ is based on oleylalkyl or tallowalkyl, viscoclastic fluids are formed with significantly less elasticity (i.e., less solid-like character) when compared to the erucylalkyl analog. In some instances, particularly with dicarboxylic acids such as isophthalic acid, phthalic acid, etc., a higher viscosity product is obtained by adding less than one mole equivalent of the acid to the amidoamine. The dicarboxylic acid salts are particularity effective at thickening fresh-water-based aqueous mediums and typically require the use of a co-surfactant to form a stable system in brine-containing aqueous mediums.

Other embodiments of the present invention are represented by the structures of formulae III–V:

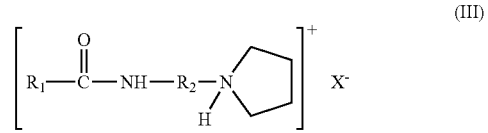

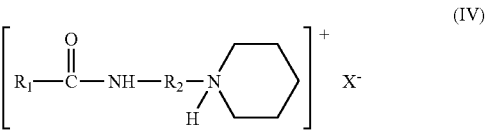

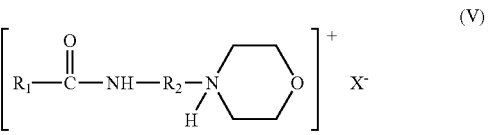

In the embodiments of formulae III–V, $R_1$, $R_2$ and X– are as defined in connection with formula I above.

Further embodiments of the present invention are represented by the following general structures of formulae VI–VII:

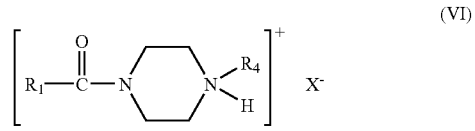

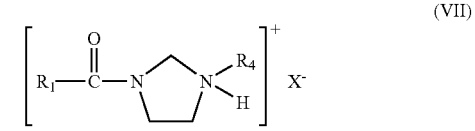

For purposes of formulae VI–VII, $R_1$, $R_4$ and X– are as defined as in connection with formula I above.

Inorganic and organic salts may optionally be added to the viscoelastic fluids to enhance fluid viscosity and other properties. Preferably, the salts will be salts of sodium, potassium, ammonium, calcium, magnesium, zinc and so forth. More specifically, the inorganic salt may include sodium chloride, potassium chloride, ammonium chloride, calcium chloride and the like. Sodium salicylates and similar salts are useful organic salts. The generally effective concentration of these salts relative to the total viscoelastic fluid is between about 0.01% to about 5% by weight, preferably from about 0.01% to about 3% by weight.

The viscoelastic surfactant formulations may require a co-surfactant to form a stable system in an aqueous medium containing brine. This appears to be especially true for the aromatic carboxylate salts of the amidoamines, such as phthalate, isophthalate, benzoate, etc. The co-surfactant may be selected from the group of surfactants consisting of cationic, anionic, zwitterionic, amphoteric surfactants and mixtures thereof. Amphoteric surfactants are preferably used as a co-surfactant in these systems. The generally effective concentration of these co-surfactants relative to the total viscoelastic fluid is between about 0.01% to about 3% by weight.

Other components may be added to the fluids of the present invention depending on the particular fluid application. Such components may include corrosion inhibitors, fluid-loss additives, demulsifiers, and so forth. Other additives, such as polymers (i.e., guar and guar derivatives, xanthan, starch and starch derivatives, polyacrylamide, cellulosic derivatives, polyacrylates, and combinations thereof) may be added as desired.

The fluids of the present invention may also be foamed by the addition of air, nitrogen, carbon dioxide and a foaming agent.

The highly preferred compound of formula II can be made by forming a salt of erucylamidopropyldimethylamine. The erucylamidopropyldimethylamine can be made by first charging molten erucic acid to a Parr 2-liter high pressure reactor. The acid is stripped at 85° C. for 1 hour with a vacuum of 25" Hg and a slight nitrogen purge. A suitable erucic acid is Edenor™ U122 which is available from Cognis Corporation of Cincinnati, Ohio. As is known, Edenor U122 is a distribution of carboxylic acid molecules predominately comprising carbon atom chains of 22 carbon atoms (i.e., approximately 90% of the distribution) but also including carboxylic acids with carbon atom chains ranging from 18 to 24 carbon atoms. Carboxylic acids having a carbon atom chain length of from about 12 to about 30 carbon atoms may be used in place of the most highly preferred erucic acid alkyl. Such carboxylic acids will typically comprise a distribution of carbon atom chain lengths.

The reactor is then cooled to 50° C. whereupon dimethylaminopropylamine ("DMAPA") is charged to the reactor. A commercial source of dimethylaminopropylamine is Air Products, Inc. of Allentown, Pa. The reactor headspace is next purged three times with nitrogen gas. The pressure of the headspace nitrogen gas is then raised to 140 psi and the reactor temperature set to 150° C. After 4 hours, or once the pressure has stabilized, the total amine value, acid content and tertiary amine values are measured to determine whether the amidoamine reaction has gone to completion.

If the analytical values indicate that the majority of the DMAPA has been consumed and that the amidoamine reaction is complete, then the reactor is vented to vacuum and the water by-product is stripped off at 60° C. When all the water has been collected, the pressure of the headspace nitrogen gas is again raised to 140 psi and the temperature is raised to 150° C. The constituents are next reacted, typically for about 8–10 hours, until the reaction is essentially complete. The resultant erucylamidopropyldimethylamine is preferably cooled to 65° C. before discharge from the reactor. The erucylamidopropyldimethylamine product is then neutralized with an equimolar, or excess, amount of suitable inorganic or organic acid to form the corresponding salt. Exemplary acids include the preferred acids described herein.

The compounds of formulae III–V can be made in the manner described with respect to formula II. However, the DMAPA is substituted, respectively, with a suitable amine analog based on pyrrolidine, piperidine or morpholine. Such amidoamine surfactant compounds are neutralized with an acid according to the molar ranges set forth with respect to formula II to form the amidoamine salt surfactant suitable for use in the viscoelastic fluid.

The N-erucylalkanoyl-N'-methylpiperizinium compound of formula VI can be prepared by reacting erucic acid (Edenor U 122) with about an equimolar amount of 1-methylpiperazine in a Parr 2-liter high pressure vessel at a temperature of about 160° C. for about 29 hours. Water is then stripped out of the reactor until less than 0.5% water is present. The resultant compound is 4-erucylamido(1-methyl)piperazine. Aldrich, Inc. of Milwaukee, Wis. is a commercial source of 1-methylpiperazine. An acid is added in an amount at least sufficient to neutralize the amidoamine surfactant to form the salt. To produce the N-erucylalkanoyl-N'-methylpiperizinium acetate salt surfactant of Example 9, the 4-erucylamido(1-methyl)piperazine is neutralized with an equimolar amount of glacial acetic acid to form the acetate salt. Other acids described herein may be used in place of the acetic acid for purposes of forming the amidoamine salt surfactant.

The compound of formula VII can be made in the manner described with respect to formula VI. However, a 1-methylimidazolidine analog is substituted for the 1-methylpiperazine. Such amidoamine surfactant compounds are neutralized with an acid according to the molar ranges set forth with respect to formula VI to form the amidoamine salt surfactant suitable for use in the viscoelastic fluid.

In a method of fracturing a subterranean formation, the surfactant-based aqueous viscoelastic hydraulic fracturing fluid is first prepared and then pumped through the wellbore and into the subterranean formation at pressures sufficient to fracture the formation. The viscoelastic fluid for use in practicing the method comprises the aqueous medium, amidoamine salt surfactant and some or all the optional components described in connection with the composition of matter. Advantageously, compositions of the invention exhibit high viscosities at elevated temperatures typical of those encountered in oilfield applications and, therefore, provide a useful alternative to known drilling fluids.

The viscoelastic fluid is preferably prepared at the site of the wellbore using any suitable vessel and mixing apparatus. The components of the viscoelastic fluid may be mixed in batches or in a continuous mixing operation. The water comprising the aqueous medium, the amidoamine surfactant and acid component may be added to the vessel in any order. Admixing of such components simultaneously results in in situ formation of the viscoelastic fluid including the amidoamine salt surfactant. Alternatively, the amidoamine salt surfactant may be preformed by admixing the amidoamine surfactant with the acid component followed by subsequent admixture of the resulting amidoamine salt surfactant component with the aqueous medium. Following formulation, the amidoamine salt surfactant will preferably comprise about 0.1% to about 10% of the total viscoelastic fluid.

A suspended particulate proppant may be added to the viscoelastic fluid at any point before or during pumping of the viscoelastic fluid into the wellbore. Suitable proppants are known to those of skill in the art and may include sand, glass beads, polystyrene beads and suitable combinations thereof.

The finished form viscoelastic fluid may then be pumped directly from the vessel to the wellbore with any suitable pumping apparatus. The fluid is pumped into the wellbore and into the subterranean formation at sufficient pressures to fracture the formation. In a hydraulic fracturing operation, a typical wellhead pressure is 10,000 psig.

At ambient temperature and pressure and, depending on the specific viscoelastic fluid components and the salts and other components present in the aqueous medium, viscoelastic fluids of the invention can be formulated to have a viscosity of between about 3,300 to about 45,000 centipoise ("cP"). Advantageously, and, as shown in the Examples, such viscoelastic fluids can be formulated to have a viscosity of about 2,500 cP to in excess of about 40,000 cP at elevated temperatures of about 50 to about 100° C. which are typical of the temperatures encountered within the wellbore and subterranean formation. Advantageously, the fluid viscosity may be adjusted by varying the fluid salt and/or acid concentrations. Adjustment of the acetic acid component yields a fluid with a viscosity of about 22,000 cP at about 98° C.—a temperature typical of those encountered in oilfield applications. Such optional additives may be added in any suitable order. Viscosity may also be adjusted by increasing or decreasing the concentration of the amidoamine salt surfactant in the finished viscoelastic fluid formulation.

In oilfield applications, such viscosities are fully adequate to enable the inventive viscoelastic fluids to serve as drilling fluids provided to transfer drill cuttings up the wellbore annulus for separation at the surface, to transfer energy to the drill bit and to control pressure on the formation while supporting the weight of the drill string. Moreover, such viscosities are sufficient to enable viscoelastic fluids of the invention to serve as completion fluids to flush out the wellbore prior to casing and without leaking off into the subterranean formation. The viscoelastic fluids of the present invention have particular utility in completion operations because they serve to thicken high brines when formulated with a co-surfactant. And, because of the desirable viscosities, the viscoelastic fluid has utility as a gravel packing fluid and as a drag reducing agent.

The invention further includes a method of controlling the rheology of an aqueous medium. The method has particular utility in controlling the viscosity of consumer product fluids such as shampoos, body washes, drain openers and hard surface cleaners, such as toilet bowl cleaners. The method of controlling fluid rheology preferably comprises the steps of providing an aqueous medium and providing an amidoamine salt surfactant in the aqueous medium to control rheology of the aqueous medium. The amidoamine salt surfactant preferably comprises about 0.1% to about 10% of the total weight of the aqueous medium and may include some or all of the optional components described fully with respect to the composition of matter.

For example, it is desirable for a toilet bowl cleaner to have a viscosity of about 50 to about 500 cP to enable the cleaner to remain in contact with the surface to be cleaned. Viscoelastic fluids of the invention can advantageously be formulated to have a viscosity within the aforementioned range notwithstanding the presence of large concentrations of strong acid components typical of those utilized in hard surface cleaners such as toilet bowl cleaners and the like. Viscoelastic fluids of the invention may be used in modifying the rheololgy of other types of fluids used in household products.

EXAMPLES

Examples 1–11 detail the viscosity profile of representative viscoelastic fluids comprising an aqueous medium and an amidoamine salt surfactant. Data are presented demonstrating the efficacy of the composition viscosity across a broad range of temperature and component conditions. All of the samples discussed in the examples displayed recoil or rebound upon abatement of stirring, a characteristic that is typical of viscoelastic fluids.

The viscosity measurements were performed on a Brookfield LVT viscometer with a Small Sample Adapter (SC4) and spindle #18 (less than 1000 cP) or #31 (1000 to 100,000 cP). Measurements were conducted at 0.3 RPM for viscosities greater than 1000 cP and were varied up to 60 RPM for lower viscosities. The erucic acid used is Edenor U122 and the dimethylaminopropylamine is from Air Products, Inc. The hydrochloric, glacial acetic and phosphoric acids used in the examples were obtained from Fisher Scientific of Pittsburgh, Pa. The 1-methylpiperazine, phthalic acid, isophthalic acid, citric acid monohydrate, potassium chloride, ammonium chloride, sodium chloride, calcium chloride and sodium sulfate used in the examples were obtained from Aldrich Chemical Company, Inc. of Milwaukee, Wis. Alkali Surfactant is a commercial product available from Tomah Products, Inc. of Milton, Wis. Ethoquad E/12-75 is a commercial product available from Akzo Nobel Chemicals, Inc. of Chicago, Ill.

Example 1

Five viscoelastic fluid formulations were prepared to demonstrate viscoelastic fluid efficacy in a brine-based aqueous media. Such brines are typical of those which may be encountered in oilfield applications. Such brine or salt-based aqueous media may also be found in consumer product fluids, for example toilet bowl cleaners, drain openers, shampoos and body washes.

An aqueous medium was prepared by admixing 0.17 g formic acid (90%) with 48 g deionized water and 0.5 g of an optional salt component. The salt component in each of the five fluids is identified in Table 1. After dissolution, each aqueous medium was heated to 60° C. and 1.35 g of molten erucylamidopropyldimethylamine was added to yield an erucylamidopropyldimethylammonium formate salt surfactant in situ. The resultant viscoelastic fluid contained 1% by weight of the salt component and 3% by weight of the amidoamine salt surfactant component. 0.6% by weight Tomah Products Alkali Surfactant was added to the sodium sulfate-based formulation to form a stable system. Each mixture was stirred at 60–70° C. for 15 minutes. Each of the five mixtures produced a clear, homogeneous thickened fluid which was cooled to room temperature before conducting viscosity measurements.

Next, each sample was heated to 98° C. and the fluid viscosity determined with the Viscometer. Viscosity measurements were taken as noted above at each of the temperatures indicated in Table 1.

TABLE 1

| Temp °C. (° F.) | Viscosity (cP) | | | | |
|---|---|---|---|---|---|
| | NH$_4$Cl | KCl | NaCl | CaCl$_2$ | Na$_2$SO$_4$ |
| 30 (86) | 31000 | 21500 | 21000 | 18500 | 30000 |
| 50 (122) | 27500 | 22000 | 15500 | 17500 | 19000 |
| 70 (158) | 49500 | 27500 | 40500 | 44000 | 260 |
| 80 (176) | 57000 | 37000 | 59500 | 62000 | 130 |
| 90 (194) | 60500 | 36500 | 66500 | 73000 | 6.5 |
| 98 (208) | 39000 | 14000 | 48000 | 48000 | 2.75 |

Example 1 demonstrates the efficacy of viscoelastic fluids of the invention. The fluids may be formulated to have viscosities suitable for use in industrial and consumer product fluids across a broad temperature range and with mono and divalent salt components.

Example 2

Three viscoelastic fluid formulations containing 3% by weight of erucylamidopropyldimethylammonium chloride salt surfactant were prepared. As noted in Table 2, the aqueous media consisted of fresh water or brines comprising 1% or 2% potassium chloride.

To 47.25 g deionized water was added 0.35 g HCl (37%) and 1.0 g KCl. After dissolution, 1.4 g molten erucylamidopropyldimethylamine was added. The mixture was agitated and stored at 65° C. for 2–3 hours. The resultant clear, homogeneous fluid was then cooled. Samples containing only fresh water (i.e., 0% KCl) and 1% KCl were made in a similar fashion.

Each of the three specimen compositions was heated to 98° C. and viscosity measurements were taken at each of the temperatures noted in Table 2.

TABLE 2

| Temp °C. (° F.) | Viscosity (cP) | | |
|---|---|---|---|
| | Fresh Water | 1.0% KCl | 2.0% KCl |
| 30 (86) | 1800 | 32000 | 20000 |
| 50 (122) | 5700 | 29500 | 15000 |
| 70 (158) | 3500 | 23500 | 17500 |
| 80 (176) | 300 | 31000 | 36500 |
| 90 (194) | 25 | 33500 | 45500 |
| 98 (208) | Not measured | 32500 | 31000 |

Example 2 shows the enhanced viscosity of erucylamidopropyldimethylammonium chloride in the presence of brine. The composition including fresh water demonstrates a viscosity effective for thickening fluids such as those utilized in formulating consumer product fluids.

Example 3

Four viscoelastic fluid samples were prepared, each comprising 3% by weight of erucylamidopropyldimethylammonium isophthalate. The molar ratios of the amidoamine surfactant and acid components were varied from a ratio of 1:1 to 1.0:0.75.

The 1:0.75 fresh water sample was prepared in the following manner (the 1:1 and 1:0.90 samples were made in a similar fashion): 48.5 g deionized water was added to 0.26 g isophthalic acid. The mixture was heated to 70° C. and 1.23 g molten erucylamidopropyldimethylamine was added to obtain a clear, thickened fluid. The 1:0.75 1% KCl sample was formulated according to the same protocol except that 0.5 g KCl was added to 47.5 g deionized water and 0.5 g of Alkali Surfactant co-surfactant was added to the aqueous medium following stirring of the viscoelastic fluid for 5–10 minutes at 70° C.

Subsequently, each viscoelastic fluid sample was heated from 30 to 98° C. while viscosity measurements were taken at each temperature noted in Table 3. FIG. 1 is a graphical presentation of the fresh water data for the 1:1 through 1:0.75 molar ratio compositions of Table 3.

TABLE 3

| Temp °C. (° F.) | Viscosity (cP) (Molar ratio amidoamine:isophthalic acid) | | | |
|---|---|---|---|---|
| | 1:1 | 1:0.9 | 1:0.75 | 1:0.75 in 1% KCl |
| 30 (86) | 2400 | 2800 | 3500 | 58500 |
| 50 (122) | 2500 | 2750 | 4450 | 4600 |
| 70 (158) | 1300 | 4200 | 6500 | 850 |
| 80 (176) | 1000 | 5150 | 9500 | 280 |
| 90 (194) | 950 | 5800 | 34000 | 180 |
| 98 (208) | 950 | 5500 | 43500 | 100 |

Example 3 demonstrates that the viscoelastic surfactant is efficacious in fresh water across a range of temperatures and further demonstrates that the viscosity of exemplary compositions according to the invention can be tailored by varying the ratio of amidoamine and acid. The 1.0:0.75 sample exhibits a viscoelastic fluid well-suited for use at elevated temperatures.

Example 4

Example 4 demonstrates the efficacy of 3% (by weight total composition) amidoamine salt surfactants based on erucylamidopropyldimethylamine and phthalic acid. Each exemplary composition was prepared in an identical manner except that the amount of acid was adjusted to achieve the molar ratios set forth in Table 4. For each of the 1:0.75 formulations of the third and fifth columns of Table 4, an aqueous medium consisting of 48.5 g deionized water was heated to 60° C. 1.16 g of molten erucylamidopropyldimethylamine and 0.34 g phthalic acid were added to the aqueous medium. Each mixture was stirred at 60–70° C. for 15 minutes. The resultant clear, homogeneous fluid was cooled to room temperature. Each sample was then heated to 98° C. and examined for viscosity at the temperatures set forth in Table 4. The other samples were made and evaluated in a similar fashion. Table 4 presents the data.

TABLE 4

| Temp °C. (° F.) | Viscosity (cP) (Molar ratio amidoamine:phthalic acid) | | | | |
|---|---|---|---|---|---|
| | 1:1 | 1:0.9 | 1:0.75 | 1:0.6 | 1:0.75 in 1% KCl |
| 30 (86) | 3000 | 3550 | 3200 | 2350 | 51000 |
| 50 (122) | 3550 | 2400 | 2600 | 900 | 2000 |
| 70 (158) | 8950 | 4000 | 2950 | 80 | 190 |
| 80 (176) | 3950 | 8050 | 2700 | 65 | 130 |
| 90 (194) | 500 | 2250 | 3350 | 37.5 | 4.5 |
| 98 (208) | 40 | 350 | 5350 | 37.5 | 2.25 |

The viscoelastic fluids of Example 4 have viscosity characteristics similar to those for the isophthalic-acid-based fluids of Example 3. The sample composition including fresh water and the 1:0.75 erucylamidopropyldimethylamine/phthalic acid ratio had the most consistent viscosity across the temperature range.

Example 5

Figure 2:
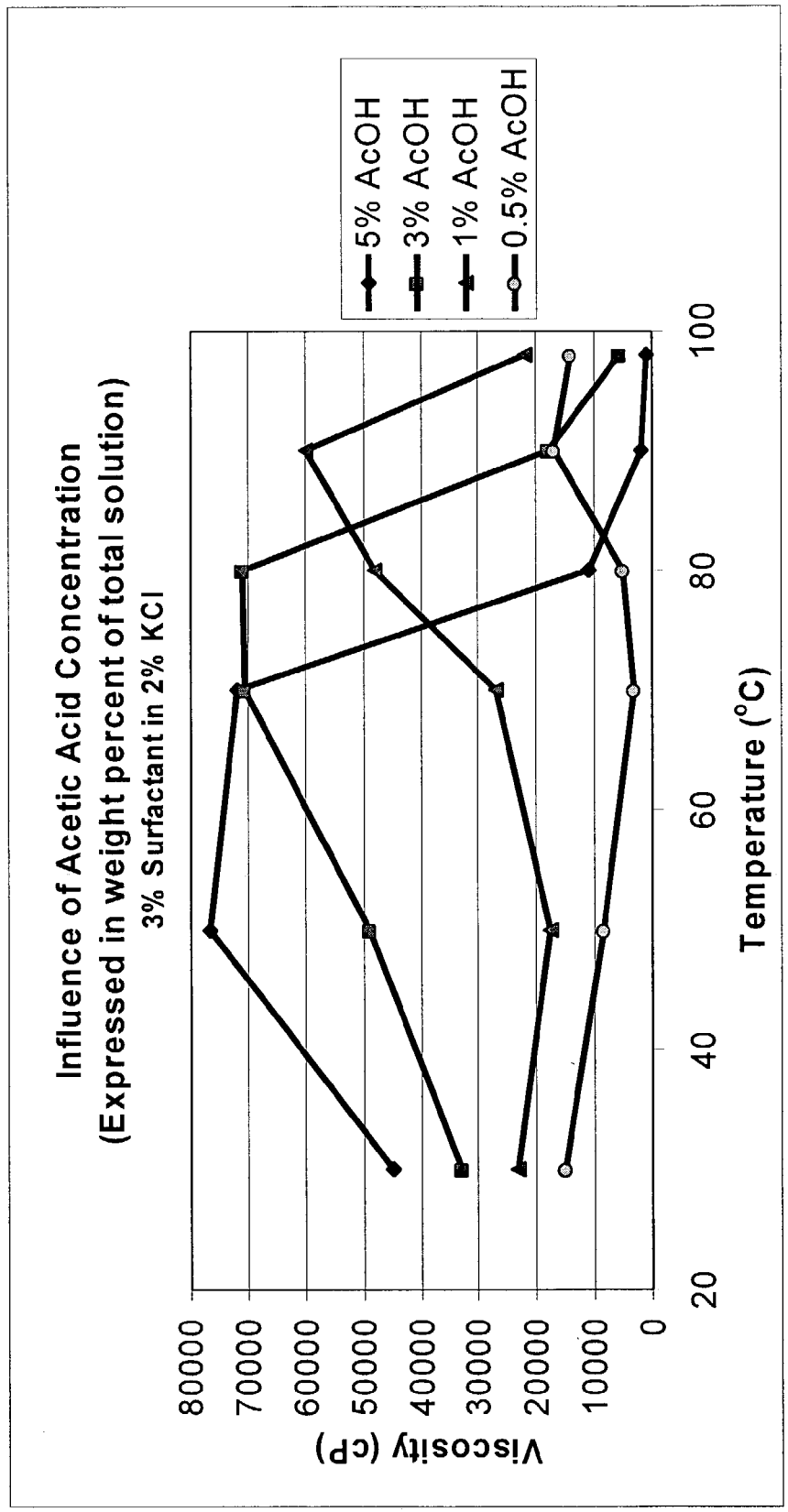
FIG. 2 is a graph which demonstrates the efficacy of further invention embodiments in a brine-based aqueous medium and further demonstrates that acid concentration may be adjusted to modify the fluid viscosity.

Four sample viscoelastic compositions were prepared based on a 3% by weight amidoamine salt surfactant comprising erucylamidopropyldimethylammonium acetate in brine. The amount of acetic acid was varied between samples to evaluate the effect of the acid concentration on fluid viscosity across the range temperatures noted in Table 5 and FIG. 2.

The samples were prepared in the following manner. For the 5.0% acetic acid-based composition, an aqueous medium comprising 47.5 g of a 5% acetic acid solution was prepared. 1.0 g (2% by weight) KCl was added. After dissolution, 1.5 g of molten erucylamidopropyldimethyl-ammonium acetate was added. Each mixture was agitated and stored at 60° C. for 2 hours. The resultant clear, homogeneous fluid was cooled to room temperature. The sample was heated to 98° C. and examined for viscosity versus temperature. Samples containing 0.5%, 1.0% and 3.0% by weight acetic acid were formulated and evaluated for viscosity according to the same protocol.

TABLE 5

| Temp ° C. (° F.) | Viscosity (cP) | | | |
|---|---|---|---|---|
| | 0.5% AcOH | 1.0% AcOH | 3.0% AcOH | 5.0% AcOH |
| 30 (86) | 15000 | 23250 | 33000 | 45000 |
| 50 (122) | 8500 | 17500 | 49000 | 76500 |
| 70 (158) | 3000 | 27000 | 70500 | 72000 |
| 80 (176) | 5000 | 48000 | 71000 | 11000 |
| 90 (194) | 17000 | 60000 | 18000 | 2000 |
| 98 (208) | 14000 | 22000 | 5500 | 1000 |

Example 5 demonstrates that the viscoelastic fluid is efficacious across a range of acid concentrations and temperatures. For a given temperature, the composition viscosity may be adjusted by varying the acetic acid concentration. The viscoelastic fluid including 1% acetic acid had the greatest viscosity at the highest temperature.

Example 6

Four sample viscoelastic compositions were prepared to evaluate the effect of modifying the weight percentage of the amidoamine salt surfactant on the fluid viscosity across a range of temperatures. Each viscoelastic fluid included erucylamidopropyldimethylammonium formate in brine. The weight percent of the amidoamine salt surfactant was varied from 3% by weight to 7.5% by weight as noted in Table 6.

The 3% surfactant sample was prepared in the following manner: To 0.17 g formic acid (90%) was added 48 g deionized water and 0.5 g (1% by weight) of ammonium chloride. After dissolution, the solution was heated to 60° C. and 1.35 g of molten erucylamidopropyldimethylamine was added. The mixture was stirred at 60–70° C. for 15 minutes. The resultant clear, homogeneous fluid was cooled to room temperature. The sample was heated to 98° C. and the viscosity observed as noted in Table 6. The 4%, 5% and 7.5% samples were made and viscosities recorded in a similar fashion.

TABLE 6

| Temp ° C. (° F.) | Viscosity (cP) Erucylamidopropyldimethylammonium Formate in 1% NH$_4$Cl | | | |
|---|---|---|---|---|
| | 3% Surfactant | 4% Surfactant | 5% Surfactant | 7.5% Surfactant |
| 30 (86) | 31000 | 41000 | 52000 | 75500 |
| 50 (122) | 27500 | 41500 | 64000 | 68500 |
| 70 (158) | 49500 | 76000 | >100000 | >100000 |
| 80 (176) | 57000 | 96000 | >100000 | >100000 |
| 90 (194) | 60500 | >100000 | >100000 | >100000 |
| 98 (208) | 39000 | 93500 | >100000 | >100000 |

Example 6 shows the impact of surfactant concentration on the viscosity profiles of erucylamidopropyldimethylammonium formate. Not surprisingly, increased surfactant concentration leads to increased viscosity.

Example 7

Example 7 shows the influence of citric acid, brine and surfactant concentration on the viscosity profile of erucylamidopropyldimethylammonium citrate. Such viscoelastic fluids would have particular application for use in consumer product fluids.

The 0% citric acid/3.0% amidoamine salt surfactant fluid was made in the following manner: To 47.5 g deionized water was added 1.0 g KCl and 0.55 g citric acid monohydrate to neutralize the amidoamine. After dissolution, 1.0 g of molten erucylamidopropyldimethylamine was added. The mixture was agitated and stored at 60° C. for 2 hours. The resultant clear, homogeneous fluid was cooled to room temperature. The sample was then heated as noted in Table 7 and the viscosity recorded at each temperature indicated in Table 7. Samples containing 5% citric acid/3.0% amidoamine, 5% citric acid/1.5% amidoamine, and 0% citric acid/3.0% amidoamine were made and viscosities noted in Table 7 in a similar manner.

TABLE 7

| Temp ° C. (° F.) | Viscosity (cP) | | | |
|---|---|---|---|---|
| | 0% Citric Acid 2% KCl 3% Surfactant | 5% Citric Acid 2% KCl 3% Surfactant | 5% Citric Acid 2% KCl 1.5% Surfactant | 0% Citric Acid 0% KCl 3% Surfactant |
| 30 (86) | 22000 | 25000 | 11000 | 1450 |
| 50 (122) | 21000 | 27000 | 9000 | 1200 |
| 70 (158) | 36500 | 33000 | 9500 | 750 |
| 80 (176) | 44000 | 33000 | 11500 | 200 |
| 90 (194) | 50000 | 20000 | 4000 | 1.5 |
| 98 (208) | 19500 | 7000 | 2000 | Not Measured |

The data demonstrate that viscoelastic fluid compositions including an amidoamine and organic acid-based anion are efficacious viscosifying agents including under conditions wherein an organic acid component is present in excess of the amount required to neutralize the amidoamine.

Example 8

Example 8 compares the viscosity properties of exemplary viscoelastic fluids of the present invention with a current industrial product, Ethoquad E/12-75 from Akzo Nobel Chemicals, Inc. Specifically, sample viscoelastic fluids based on 3% by weight of erucylalkylamidopropyldimethylammonium chloride, formate and citrate and 2% by weight KCl brine are compared to a surfactant comprising 3% by weight erucylalkyl bis(2-hydroxyethyl)methylammonium chloride (Ethoquad E/12-75 from Akzo Nobel) also in a 2% KCl brine.

The amidoamine salt samples were prepared as discussed in previous examples. The Ethoquad E/12-75 sample was prepared by adding 2.0 g molten Ethoquad E/12-75 to a solution of 1.0 g KCl in 47.0 g deionized water at room temperature. The mixture was agitated and was stored at 65° C. for 2 hours. A clear, homogeneous fluid resulted. The sample was cooled and centrifuged to remove bubbles.

Figure 3:
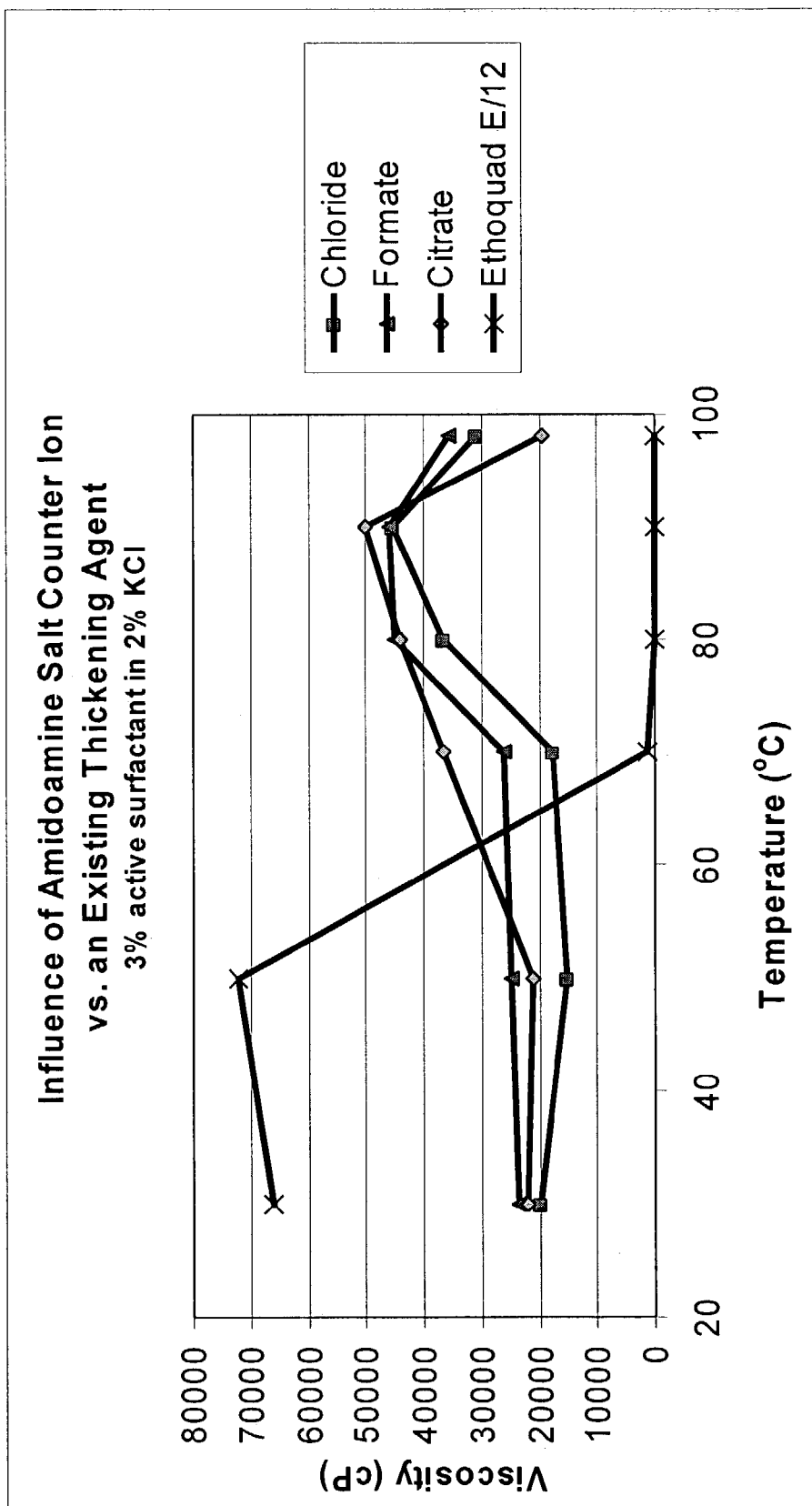
FIG. 3 is a graph which demonstrates the efficacy of further invention embodiments at elevated temperatures typical of those encountered in an oilfield application versus an existing thickening agent.

All of the samples were heated and viscosity determined using the viscometer. The data are recorded in Table 8 and are presented in graphical form in FIG. 3.

TABLE 8

| Temp ° C. (° F.) | Viscosity (cP) 3% Surfactant (actives basis) in 2% KCl | | | |
|---|---|---|---|---|
| | Chloride | Formate | Citrate | Ethoquad E/12-75 |
| 30 (86) | 20000 | 23500 | 22000 | 66500 |
| 50 (122) | 15000 | 25000 | 21000 | 72000 |
| 70 (158) | 17500 | 26000 | 36500 | 1250 |
| 80 (176) | 36500 | 45000 | 44000 | 100 |
| 90 (194) | 45500 | 46000 | 50000 | 17.5 |
| 98 (208) | 31000 | 35500 | 19500 | 7.5 |

The data demonstrate that compositions of the invention are efficacious viscosifying agents across the temperature range. Moreover, at elevated temperatures, compositions of the invention have greater viscosities than the Ethoquad E/12-75.

Example 9

Example 9 shows the viscosity profile of an amidoamine salt surfactant based on a 1-methylpiperizinium analog of the type represented by formula VI. The aqueous medium for each sample consisted of either fresh water or brine.

For the fresh water-based embodiment, 0.75 g of N-erucylalkanoyl-N'-methylpiperizinium acetate was added to 19.25 g 1% acetic acid. The mixture was agitated and was stored at 65° C. for 2 hours. The resultant clear, homogenous fluid was cooled. The composition was heated to 80° C. and viscosity measured using the viscometer at the temperatures noted. For the brine-based embodiment, 0.25 g NH$_4$Cl was added to 18.75 g of 1% acetic acid. After dissolution, 0.75 g of N-erucylalkanoyl-N'-methylpiperizinium acetate was added. The mixture was agitated and was stored at 65° C. for 2 hours. Alkali Surfactant in the amount of 0.7 g was added to form a clear, homogenous fluid which was cooled. The fluid was heated to 80° C. and viscosity was determined with the viscometer at the temperatures noted in Table 9.

TABLE 9

| Temp ° C. | Viscosity (cP) | |
|---|---|---|
| (° F.) | Fresh Water | 1.0% NH$_4$Cl |
| 30 (86) | 7200 | 23500 |
| 50 (122) | 4900 | 1100 |
| 70 (158) | 42.5 | 25 |
| 80 (176) | 1 | 2.5 |

The data show that N-erucylalkanoyl-N'-methylpiperizinium acetate is an effective thickening agent, particularly at lower temperature ranges typical of consumer product fluid applications.

Example 10

Example 10 compares the performance of 3% (by weight) amidoamine salt surfactants based on tallowalkyl, oleylalkyl and erucylalkyl derivatives. The tallowalkyl-based sample was prepared in the following manner: To 47.5 g deionized water was added 11.0 g (2% by weight) KCl. After dissolution, 1.5 g tallowalkyl amidopropyldimethylammonium acetate was added. The salt was preformed by reacting the tallowalkyl amidopropyldimethylamine with an equimolar amount of glacial acetic acid. The mixture was agitated and stored at 65° C. for 2–3 hours. The resultant clear, homogeneous fluid was heated and analyzed for viscosity versus temperature as presented in Table 10. Samples based on erucylalkyl and oleylalkyl were made in a similar fashion. The erucylalkyl sample further included 1.0% by weight of acetic acid. (No performance benefit was observed when the tallowalkyl or oleylalkyl salts were run in 1.0% acetic acid.) The data are presented in Table 10.

TABLE 10

| Temp ° C. | Viscosity (cP) | | |
|---|---|---|---|
| (° F.) | Tallowalkyl | Oleylalkyl | Erucylalkyl |
| 30 (86) | 90 | 360 | 23250 |
| 50 (122) | 40 | 70 | 17500 |
| 70 (158) | Not measured | 40 | 27000 |

The data demonstrate that, as the fatty alkyl chain length is reduced, viscosity is reduced.

Example 11

Example 11 shows the acid thickening profile of the erucylalkyl amidopropyldimethylamine in viscoelastic fluids containing phosphoric acid and hydrochloric acid. Table 11 shows the viscosity data in 20% phosphoric acid and 17% hydrochloric acid while Table 12 shows the results in 50% and 5% phosphoric acid. Such acid concentrations are typical of those found in consumer product fluids, such as hard surface cleaners. The phosphate or chloride salt is presumably formed in situ as the active viscosifier.

To 75.5 g deionized water was added 23.5 g phosphoric acid (85%) and 1.0 g erucylalkyl amidopropyldimethylamine. The sample was then stored at 60° C. for 1 hour. The sample was cooled to room temperature (25° C.) and was examined on a Brookfield RVT, spindle #3. Samples containing 2.0%, 2.5% and 3.0% amidoamine and the samples of Table 12 containing 5% and 50% phosphoric acid with 1 to 3% amidoamine were made in a similar fashion.

A sample containing 17% HCl and 3.0% surfactant was also made in a similar fashion. The two 3.0% surfactant compositions included a surfactant component consisting of 2.0% erucylalkylamidopropyldimethylamine and 1.0% Alkali Surfactant co-surfactant.

TABLE 11

| | Viscosity (cP) at 25° C. | | | | |
|---|---|---|---|---|---|
| | | 20% $H_3PO_4$ | | | 17% HCl 3.0% |
| RPM | 1.0% Amidoamine | 2.0% Amidoamine | 2.5% Amidoamine | 3.0% Amidoamine | Surfactant |
| 10 | 500 | 1650 | 2300 | 2950 | Not Measured |
| 50 | 160 | 480 | 720 | 930 | 360 |
| 100 | 105 | 310 | 460 | 550 | 225 |

TABLE 12

| | Viscosity (cP) at 25° C. | | | | |
|---|---|---|---|---|---|
| | | 5% $H_3PO_4$ | | | 50% $H_3PO_4$ 3.0% |
| RPM | 1.0% Amidoamine | 2.0% Amidoamine | 2.5% Amidoamine | 3.0% Amidoamine | Amidoamine |
| 10 | 600 | 1500 | 2200 | 2700 | 300 |
| 50 | 220 | 520 | 800 | 880 | 250 |
| 100 | 160 | 350 | 550 | 580 | 210 |

The data demonstrate that the composition is efficacious for use in compositions including high concentrations of acids, particularly strong acids.

While the principles of this invention have been described in connection with specific embodiments and methods, it should be understood clearly that these descriptions are made only by way of example and are not intended to limit the scope of the invention.

What is claimed is:

1. A viscoelastic fluid comprising:
   an aqueous medium; and
   an amidoamine salt surfactant having the following general structural formula:

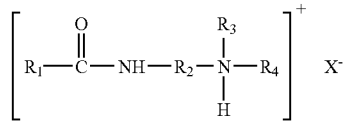

wherein,
   $R_1$ is a branched or straight chained, saturated or unsaturated aliphatic group of from about 17 to about 29 carbon atoms;
   $R_2$ is (a) a divalent alkylene group consisting of from about 2 to about 6 carbon atoms, or (b) $R_2$ together with $R_3$ form a heterocyclic 5- or 6-membered ring structure which includes the nitrogen of the amine and the nitrogen of the amide;
   $R_3$ is (a) a branched or straight chained alkyl group of from about 1 to about 6 carbon atoms or a branched or straight chained hydroxyalkyl group, or (b) $R_3$ together with $R_2$ form a heterocyclic 5- or 6-membered ring structure which includes the nitrogen of the amine and the nitrogen of the amide, or (c) $R_3$ together with $R_4$ form a heterocyclic 5- or 6-membered ring structure which includes the nitrogen of the amine;
   $R_4$ is (a) a branched or straight chained alkyl group or hydroxyalkyl group of from about 1 to about 6 carbon atoms, or (b) $R_4$ together with $R_3$ form a heterocyclic 5- or 6-membered ring structure which includes the nitrogen of the amine;
   $X-$ is an anion; and
   the amidoamine salt surfactant is present in a sufficient amount such that the fluid at least partially recovers to an initial state after abatement of an applied stress and has properties of reversible sheer thinning.

2. The viscoelastic fluid of claim 1 wherein $R_1$ comprises an alkyl group derived from tallow, soybean, rapeseed oil or mixtures thereof.

3. The viscoelastic fluid of claim 1 wherein $R_1$ comprises about 17 to about 23 carbon atoms.

4. The viscoelastic fluid of claim 1 wherein $R_2$ is an alkylene group having about 3 carbon atoms.

5. The viscoelastic fluid of claim 1 wherein $R_3$ and $R_4$ are each selected from the group consisting of alkyl, alkenyl and hydroxyalkyl groups.

6. The viscoelastic fluid of claim 1 wherein the viscoelastic fluid comprises:
   about 0.1% to about 10% by weight of amidoamine salt surfactant; and
   the aqueous medium.

7. The viscoelastic fluid of claim 6 wherein the amidoamine salt surfactant comprises about 1% to about 8% by weight of the viscoelastic fluid.

8. The viscoelastic fluid of claim 7 wherein the amidoamine salt surfactant comprises about 2% to about 4% by weight of the viscoelastic fluid.

9. The viscoelastic fluid of claim 1 wherein
   $X-$ is an anion dissociated from an acid component selected from the group consisting of inorganic and organic acids.

10. The viscoelastic fluid of claim 9 wherein the acid component is selected from the group consisting of phosphoric acid, sulfuric acid, hydrochloric acid, hydrobromic acid, hydroiodic acid, hypochloric acid, acetic acid, other aliphatic carboxylic acids, perchloric acid, formic acid, salicylic acid, phthalic acid, isophthalic acid, terphthalic acid, lactic acid, malic acid, citric acid, benzoic acid, napthoic acid and mixtures thereof.

11. The viscoelastic fluid of claim 10 wherein the acid component comprises about 0.01% to about 50% by weight of the viscoelastic fluid.

12. The viscoelastic fluid of claim 11 wherein the acid component comprises about 0.01% to about 20% by weight of the viscoelastic fluid.

13. The viscoelastic fluid of claim 1 further including a salt component selected from the group consisting of organic salts, inorganic salts and mixtures thereof.

14. The viscoelastic fluid of claim 13 wherein the salt component comprises an inorganic salt selected from the group consisting of sodium chloride, potassium chloride, ammonium chloride, calcium chloride and mixtures thereof.

15. The viscoelastic fluid of claim 13 wherein the salt component comprises about 0.1 to about 5% by weight of the viscoelastic fluid.

16. The viscoelastic fluid of claim 15 wherein the salt component comprises about 0.1 to about 3% by weight of the viscoelastic fluid.

17. The viscoelastic fluid of claim 16 wherein the salt component comprises about 0.1 to about 2% by weight of the viscoelastic fluid.

18. The viscoelastic fluid of claim 1 further including a co-surfactant selected from the group consisting of cationic, anionic, zwitterionic and amphoteric surfactants and mixtures thereof.

19. The viscoelastic fluid of claim 18 wherein the co-surfactant comprises about 0.01 to about 3% of the viscoelastic fluid.

20. A viscoelastic fluid comprising:
about 0.1% to about 10% by weight of an amidoamine salt surfactant having the following general structural formula:

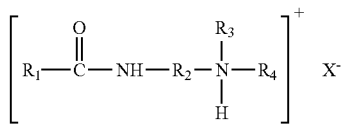

wherein,
$R_1$ is a branched or straight chained, saturated or unsaturated aliphatic group of from about 17 to about 29 carbon atoms;
$R_2$ is (a) a divalent alkylene group consisting of from about 2 to about 6 carbon atoms, or (b) $R_2$ together with $R_3$ form a heterocyclic 5- or 6-membered ring structure which includes the nitrogen of the amine and the nitrogen of the amide;
$R_3$ is (a) a branched or straight chained alkyl group of from about 1 to about 6 carbon atoms or a branched or straight chained hydroxyalkyl group, or (b) $R_3$ together with $R_2$ form a heterocyclic 5- or 6-membered ring structure which includes the nitrogen of the amine and the nitrogen of the amide, or (c) $R_3$ together with $R_4$ form a heterocyclic 5- or 6-membered ring structure which includes the nitrogen of the amine;
$R_4$ is (a) a branched or straight chained alkyl group or hydroxyalkyl group of from about 1 to about 6 carbon atoms, or (b) $R_4$ together with $R_3$ form a heterocyclic 5- or 6-membered ring structure which includes the nitrogen of the amine; and
X– is an anion; and
the balance comprises an aqueous medium;
wherein, the fluid at least partially recovers to an initial state after abatement of an applied stress and has properties of reversible sheer thinning.

21. The viscoelastic fluid of claim 20 wherein $R_1$ comprises an alkyl group derived from tallow, soybean, rapeseed oil or mixtures thereof.

22. The viscoelastic fluid of claim 20 wherein $R_1$ comprises about 17 to about 23 carbon atoms.

23. The viscoelastic fluid of claim 20 wherein $R_1$ comprises erucylalkyl.

24. The viscoelastic fluid of claim 20 wherein $R_2$ is an alkylene group having about 3 carbon atoms.

25. The viscoelastic fluid of claim 20 wherein $R_3$ and $R_4$ are each methyl groups.

26. The viscoelastic fluid of claim 20 wherein $R_2$ together with $R_3$ comprise a heterocyclic 6-membered ring structure which includes the nitrogen of the amine and the nitrogen of the amide and $R_4$ comprises a methyl group.

27. The viscoelastic fluid of claim 20 wherein X– is selected from the group consisting of oxo ions of phosphorus, sulfur or chloride, chlorides, bromides, iodides, oxides of phosphorus, hypochlorides, phosphates, oxides of sulfur, sulfates, sulfites, sulfonates, phosphates, acetates, other aliphatic carboxylates, chlorates, formates, perchlorates, salicylates, phthalates, isophthalates, terphthalates, lactates, maleates, glycinates, citrates, benzoates and napthoates.

28. The viscoelastic fluid of claim 20 further including a salt component selected from the group consisting of sodium chloride, potassium chloride, ammonium chloride, calcium chloride and mixtures thereof.

29. The viscoelastic fluid of claim 20 further including a co-surfactant selected from the group consisting of cationic, anionic, zwitterionic and amphoteric surfactants and mixtures thereof.

30. The viscoelastic fluid of claim 29 wherein the co-surfactant comprises about 0.01 to about 3% by weight of the viscoelastic fluid.

31. A method of fracturing a subterranean formation comprising the steps of:
providing a surfactant-based aqueous viscoelastic hydraulic fracturing fluid comprising:
an aqueous medium; and
an amidoamine salt surfactant having the following general structural formula:

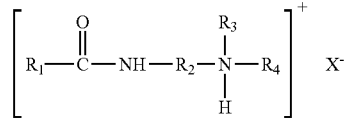

wherein,
$R_1$ is a branched or straight chained, saturated or unsaturated aliphatic group of from about 17 to about 29 carbon atoms;
$R_2$ is (a) a divalent alkylene group consisting of from about 2 to about 6 carbon atoms, or (b) $R_2$ together with $R_3$ form a heterocyclic 5- or 6-membered ring structure which includes the nitrogen of the amine and the nitrogen of the amide;
$R_3$ is (a) a branched or straight chained alkyl group of from about 1 to about 6 carbon atoms or a branched or straight chained hydroxyalkyl group, or (b) $R_3$ together with $R_2$ form a heterocyclic 5- or 6-membered ring structure which includes the nitrogen of the amine and the nitrogen of the amide, or (c) $R_3$ together with $R_4$ form a heterocyclic 5- or 6-membered ring structure which includes the nitrogen of the amine;
$R_4$ is (a) a branched or straight chained alkyl group or hydroxyalkyl group of from about 1 to about 6 carbon atoms, or (b) $R_4$ together with $R_3$ form a heterocyclic 5- or 6-membered ring structure which includes the nitrogen of the amine;
X– is an anion; and
the amidoamine salt surfactant is present in a sufficient amount such that the fluid at least partially recovers to an initial state after abatement of an applied stress and has properties of reversible sheer thinning; and
pumping the surfactant-based aqueous viscoelastic hydraulic fracturing fluid through a wellbore and into a subterranean formation at sufficient pressures to fracture the formation.

32. The fracturing method of claim 31 wherein $R_1$ comprises an alkyl group derived from tallow, soybean, rapeseed oil or mixtures thereof.

33. The fracturing method of claim 31 wherein $R_1$ comprises about 17 to about 23 carbon atoms.

34. The fracturing method of claim 31 wherein $R_2$ is an alkylene group having about 3 carbon atoms.

35. The fracturing method of claim 31 wherein $R_3$ and $R_4$ are each selected from the group consisting of alkyl, alkenyl, hydroxyalkyl groups.

36. The fracturing method of claim 31 wherein the viscoelastic hydraulic fracturing fluid comprises:
about 0.1% to about 10% by weight of the amidoamine salt surfactant; and
the balance, aqueous medium.

37. The fracturing method of claim 31 wherein
X– is an anion dissociated from an acid component selected from the group consisting of inorganic and organic acids.

38. The fracturing method of claim 37 wherein the acid component is selected from the group consisting of phosphoric acid, sulfuric acid, hydrochloric acid, hydrobromic acid, hydroiodic acid, hypochloric acid, acetic acid, other aliphatic carboxylic acids, perchloric acid, formic acid, salicylic acid, phthalic acid, isophthalic acid, terphthalic acid, lactic acid, malic acid, citric acid, benzoic acid, napthoic acid and mixtures thereof.

39. The fracturing method claim 38 wherein the acid component comprises about 0.01% to about 50% by weight of the viscoelastic hydraulic fracturing fluid.

40. The fracturing method of claim 39 wherein the acid component comprises about 0.01% to about 20% by weight of the viscoelastic hydraulic fracturing fluid.

41. The fracturing method of claim 31 further including a salt component selected from the group consisting of organic salts, inorganic salts and mixtures thereof.

42. The fracturing method of claim 41 wherein the salt component comprises an inorganic salt selected from the group consisting of sodium chloride, potassium chloride, ammonium chloride, calcium chloride and mixtures thereof.

43. The fracturing method of claim 41 wherein the salt component comprises about 0.1 to about 5% of the viscoelastic hydraulic fracturing fluid.

44. The fracturing method of claim 31 further including a co-surfactant selected from the group consisting of cationic, anionic, zwitterionic and amphoteric surfactants and mixtures thereof.

45. The fracturing method of claim 44 wherein the co-surfactant comprises about 0.01 to about 3% of the viscoelastic hydraulic fracturing fluid.

46. The fracturing method of claim 31 wherein the viscoelastic hydraulic fracturing fluid further comprises a suspended particulate proppant.

47. The fracturing method of claim 46 wherein the fracturing fluid proppant is selected from the group consisting of sand, glass beads and polystyrene beads.

48. A method for controlling the rheology of an aqueous medium comprising the steps of:
providing an aqueous medium; and
providing an amidoamine salt surfactant in the aqueous medium to control rheology of the aqueous medium such that the aqueous medium has a viscosity in excess of about 50 centipoise, said amidoamine salt surfactant comprising about 0.1% to about 10% of the total weight of the aqueous medium and having the general structural formula:

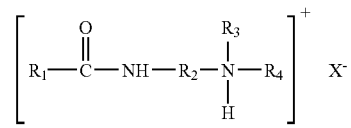

wherein,
$R_1$ is a branched or straight chained, saturated or unsaturated aliphatic group of from about 17 to about 29 carbon atoms;
$R_2$ is (a) a divalent alkylene group consisting of from about 2 to about 6 carbon atoms, or (b) $R_2$ together with $R_3$ form a heterocyclic 5- or 6-membered ring structure which includes the nitrogen of the amine and the nitrogen of the amide;
$R_3$ is (a) a branched or straight chained alkyl group of from about 1 to about 6 carbon atoms or a branched or straight chained hydroxyalkyl group, or (b) $R_3$ together with $R_2$ form a heterocyclic 5- or 6-membered ring structure which includes the nitrogen of the amine and the nitrogen of the amide, or (c) $R_3$ together with $R_4$ form a heterocyclic 5- or 6-membered ring structure which includes the nitrogen of the amine;
$R_4$ is (a) a branched or straight chained alkyl group or hydroxyalkyl group of from about 1 to about 6 carbon atoms, or (b) $R_4$ together with $R_3$ form a heterocyclic 5- or 6-membered ring structure which includes the nitrogen of the amine; and
X– is an anion.

49. The method of claim 48 wherein $R_1$ comprises an alkyl group derived from tallow, soybean, rapeseed oil or mixtures thereof.

50. The method of claim 48 wherein $R_1$ comprises about 17 to about 23 carbon atoms.

51. The method of claim 48 wherein $R_2$ is an alkylene group having about 3 carbon atoms.

52. The method of claim 48 further comprising, at any time, the step of providing an acid component in the aqueous medium, said acid component being selected from the group consisting of inorganic and organic acids and X– is an anion dissociated from the acid component.

53. The method of claim 52 wherein the acid component is selected from the group consisting of phosphoric acid, sulfuric acid, hydrochloric acid, hydrobromic acid, hydroiodic acid, hypochloric acid, acetic acid, other aliphatic carboxylic acids, perchloric acid, formic acid, salicylic acid, phthalic acid, isophthalic acid, terphthalic acid, lactic acid, malic acid, citric acid, benzoic acid, napthoic acid and mixtures thereof.

54. The method of claim 53 wherein the step of providing the acid component comprises providing said acid component in an amount of about 0.01% to about 50% by weight of the aqueous medium.

55. The method of claim 54 wherein the acid component comprises about 0.01% to about 20% by weight of the aqueous medium.

56. The method of claim 48 further comprising, at any time, the step of providing a salt component in the aqueous medium, said salt component being selected from the group consisting of organic salts, inorganic salts and mixtures thereof.

57. The method of claim 56 wherein the salt component comprises an inorganic salt selected from the group consisting of sodium chloride, potassium chloride, ammonium chloride, calcium chloride and mixtures thereof.

58. The method of claim 56 wherein the step of providing the salt component comprises providing said salt component in an amount of about 0.1 to about 5% by weight of the aqueous medium.

59. The method of claim 48 further comprising, at any time, the step of providing a co-surfactant in the aqueous medium, said co-surfactant being selected from the group consisting of cationic, anionic, zwitterionic and amphoteric surfactants and mixtures thereof.

60. The method of claim 59 wherein the step of providing the co-surfactant comprises providing said co-surfactant in an amount of about 0.01 to about 3% by weight of the aqueous medium.

61. The method of claim 48 wherein $R_3$ and $R_4$ are each selected from the group consisting of alkyl, alkenyl, hydroxyalkyl groups.

* * * * *